Patented Nov. 16, 1937

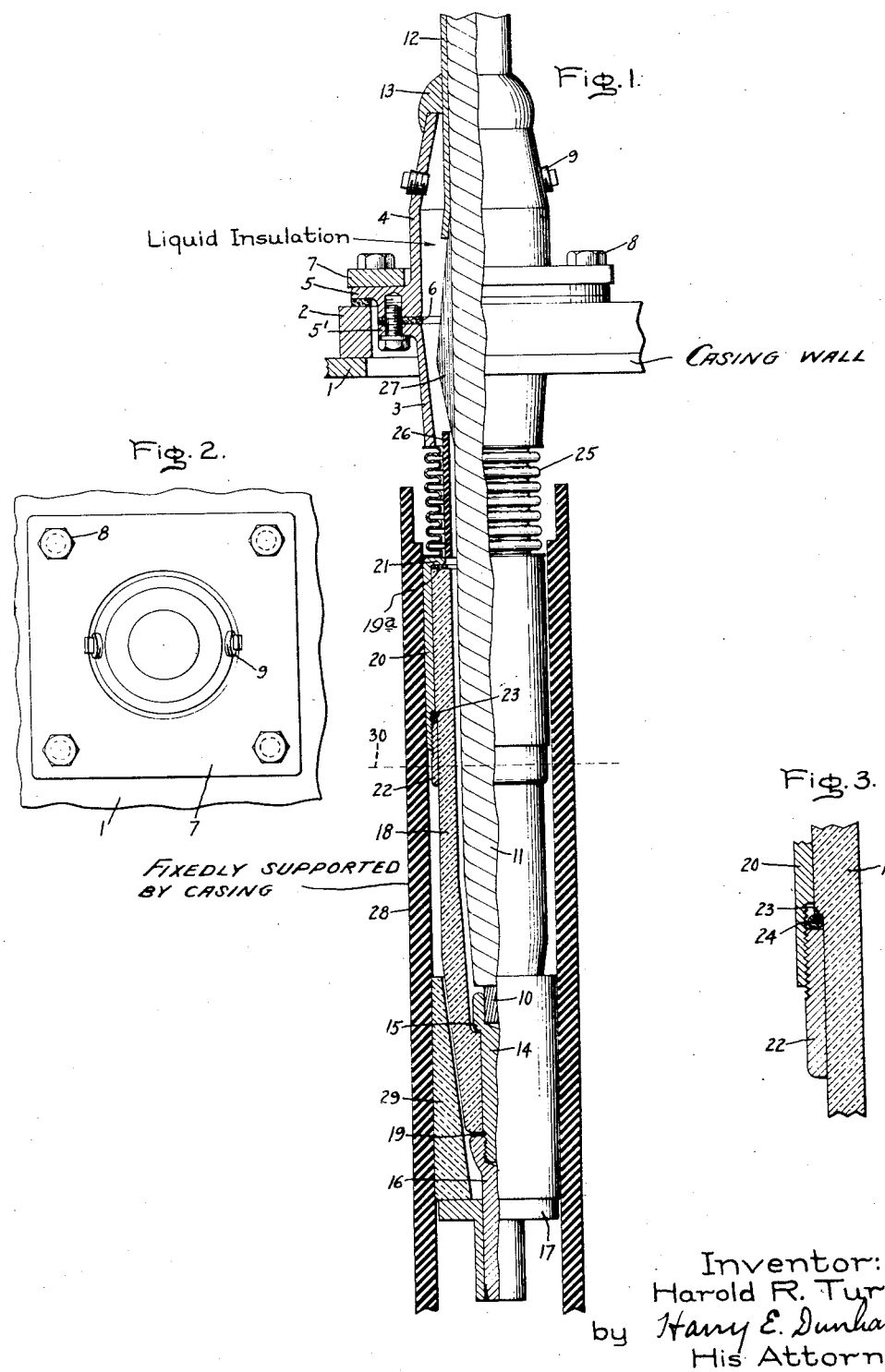

2,099,581

UNITED STATES PATENT OFFICE 2,099,581

TERMINAL FOR LEAD COVERED CABLES

Harold R. Turner, Pittsfield, Mass., assignor to General Electric Company, a corporation of New York Application March 6, 1935, Serial No. 9,629

6 Claims. (Cl. 173—353)

With certain types of apparatus, specifically transformers, it is necessary to connect the parts which are within a closed metallic casing to an external lead covered cable employed to convey electric current to or from the said parts. It is also necessary that the terminal end of the cable entering the closed casing be well insulated from the wall of the casing, and for this purpose, tubular insulators are utilized which are commonly made of porcelain because of their high insulating properties. One trouble incident to the use of such an insulator is the danger to fracture while the parts are being initially installed or to some subsequent movement of the cable due to strains to which it may be subjected while in use. Cables used for this purpose which have to carry heavy currents comprise a conductor, a covering of insulating material such as tightly wrapped paper and an external sheath made of lead. Such cables while capable of being bent within reasonable limits are nevertheless relatively stiff and require careful handling to prevent injury to the insulator. Another and outstanding problem involved in the bending of such cable is that due to the difference in diameter of the conductor and the enclosing sheath, the conductor and sheath have differential movements, one with respect to the other. This differential movement imposes undue strains on the insulator tending to crack it. Because the insulator is located wholly within a closed casing such an injury to the insulator is not readily detected.

My invention has for its object the provision of an improved terminal construction for metal covered cable to the end that destructive strains on the insulators associated therewith are avoided.

For a consideration of what I believe to be novel and my invention, attention is directed to the accompanying description and the claims appended thereto.

In the drawing, Fig. 1 illustrates partly in elevation and partly in longitudinal section a terminal illustrative of my invention; Fig. 2 is a top plan view, and Fig. 3 a detail view.

1 indicates the top metal wall of a chambered casing which encloses the parts of a transformer or other apparatus to be connected to a cable. These parts have not been illustrated, being unnecessary to an understanding of my invention. On top of the casing wall is mounted a seating member 2 which may form an integral part of the wall or be secured thereto in such manner as to form a fluid tight joint. Mounted on the seating member is a cable housing comprising two parts 3 and 4 which have outturned flanges 5 and 5' united by bolts with a gasket 6 between adjacent surfaces to make a fluid tight joint. The flange 5 rests on the seating member with a gasket between adjacent surfaces. The parts thus far described are held in place by a clamping member 7, the latter having holding bolts 8 arranged as shown in Fig. 2. The upper half of the housing has two openings which may be used to admit insulating fluid to the interior of the terminal. Both openings may be closed by screw threaded plugs 9 or one of them may have a pipe connected to a source of supply of insulating liquid such as a reservoir.

The cable intended to be connected to the apparatus within the casing comprises a stranded conductor 10 which is covered by insulation 11 such as tightly wrapped paper ribbon. Outside the insulation is a sheath 12 made of lead or other suitable material which prevents the escape of insulating liquid and the admission of foreign matter. The sheath, in this case lead, is connected to the cable housing by a wipe soldered joint 13. As previously indicated, the conductor and its sheath have differential movements either due to bending of the cable or to temperature changes or both.

To the lower end of the conductor is secured, as by solder, a socketed terminal element 14 which has an external shoulder 15 and a screw threaded lower end arranged to receive the terminal part 16, the latter entering a socket in the fixed terminal element 17 which may form a part of the apparatus in the casing or be separate therefrom and suitably connected electrically. The parts 14 and 16 are in effect a part of the conductor 10 and are made of separate pieces because it is simpler to do so than to attempt to shape the end of a stranded conductor, and also because it is necessary to form a suitable support and fluid tight joint for the inner end of the insulator as will appear later. The portion of the terminal element 14 between the shoulder 15 and the screw threaded end is turned smooth to form a support for the lower small end of a porcelain insulator 18, the latter having two shoulders at said end. The insulator is held in place on the terminal element 14 by the terminal part 16 which has an external shoulder and which also acts as a clamping nut. Between the shoulders in the insulator and the metal surfaces are interposed gaskets 19 to make fluid tight joints and also to compensate for any irregular surfaces on the cooperating parts.

The insulator 18 is of tubular form and is in spaced relation to the insulation on the conductor, the space thus formed being filled with insulating liquid. Surrounding the upper end of the insulator is a metal sleeve 20 which has an inturned flange 21 at its upper end with which the insulator engages, there being a suitable gasket 19a between adjacent surfaces. The lower end of the sleeve is internally threaded to receive the clamping nut 22. The insulator has a peripheral shoulder 23 and seated on the shoulder and clamped in place by the nut is a gasket 24 of suitable material which is unaffected by the liquid insulation within the insulator.

From the foregoing, it will be seen that the insulator is rigidly secured at its lower end to the conductor and that its upper end is in spaced relation to the conductor covering. In order that a limited but nevertheless appreciable amount of longitudinal movement may take place between the sheath of the cable which is supported by the housing and the conductor, and also a slight sidewise movement between the insulator 18 and the cable insulation, a corrugated diaphragm 25 is provided, the lower end of which is secured to the upper end of the sleeve 20 and its upper end to the housing. These parts may be united by soldering, brazing, welding or equivalent means. The diaphragm is relatively long and provided with numerous corrugations to render it flexible or yielding and also so that the fatiguing of the metal due to relative movements of the parts will be very small.

Inside of the diaphragm is a tube 26 of insulating material which acts as a mechanical protector between the inner bends of the diaphragm and the paper insulation on the cable and also as an insulator. Above the tube is a reinforcement 27 made of insulating tape or other suitable insulation.

Enclosing the parts thus far described as being within the casing is a means such as a tube or framework 28 of insulating material supported by suitable means with the casing, the details of which are unimportant so long as the means is maintained in concentric relation to the terminal. Located within the means 28 and supported thereby is a block of insulation 29 which as shown rests on the fixed terminal socketed element 17, the latter being supported or positioned by said means. The block is provided with a tapered opening with the small end at the bottom, the purpose of the arrangement being to guide the terminal element 16 into its socket when the terminal as a whole is lowered through the opening in the top wall of the casing. The terminal constructed as described is first completed outside of the casing and then lowered into it through the opening in the top wall. The wipe joint 13 between the housing and the sheath may be made before or after the terminal is inserted in place.

It will be seen from what has been said that when the cable is bent adjacent the terminal, as it usually is for the purposes of insulation, and the conductor and sheath are thereby caused to have dissimilar or differential movements that the diaphragm will stretch or be compressed, as the case may be, and that no objectionable strains of any kind will be imparted to the insulator and hence danger of its breaking due to such movements is completely avoided. Also, that the insulator may have the necessary sidewise movements to compensate for the lack of exact alignment. In addition to acting as a resilient means to prevent injury to the insulator, the diaphragm also serves to connect the housing and the insulator in a fluid tight manner so that the terminal may be filled with a liquid insulation which may be and often is unlike that used for the apparatus within the casing. In conjunction with the other associated parts, the diaphragm also permits of the terminal being entirely filled with insulating liquid which could not otherwise be done unless the chambered casing 1 was completely filled with liquid insulation, which is commonly not the case. The horizontal dotted line 30 in Fig. 1 indicates the normal level of the liquid insulation within the casing.

A further and material advantage of my improved construction resides in the fact that the use of sliding contacts to take care of differential movements is avoided, which results in a simplification of the structure, especially when heavy currents are involved. The improved construction also has the advantage of a reduction in size, especially in diameter, over prior constructions in addition to being of reasonable cost. The corrugated diaphragm also compensates for any lack of axial alignment of the terminal elements with the fixed socketed terminal due to any cause.

What I claim as new and desire to secure by Letters Patent of the United States is:

1. In combination, a casing having an opening in a wall thereof, a housing supported by the casing and having a portion extending through the opening into the casing, a cable comprising an insulated conductor extending through the housing into the casing, the inner end of said conductor being unrestrained as to longitudinal movements, a sheath for the cable terminating within the housing and secured to the outer end thereof, a tubular insulator located wholly within the casing in spaced relation to the inner end of the housing, said conductor extending through said insulator, a metallic terminal rigidly secured to the conductor and forming a support for the inner end of the insulator, and a tubular flexible member surrounding the conductor, said member being connected at its inner end to the tubular insulator and at its outer end to the portion of the housing located within the casing.

2. In combination, a casing having an opening in a wall thereof, a housing supported by the casing and having a portion extending through the opening into the casing, a cable comprising a sheathed insulated conductor extending through the housing into the casing, the inner end of said conductor being unrestrained as to longitudinal movements, the sheath of said cable terminating within the housing, a joint between the outer end of the housing and sheath forming a support for that portion of the cable located within the housing and casing, a terminal attached to the inner end of the conductor, a tubular insulator surrounding the insulation on the conductor in spaced relation thereto, the inner end of the insulator being supported by the peripheral wall of the terminal, a corrugated tubular member surrounding the insulated conductor in spaced relation thereto, the inner end of the member being sealed to and supporting the outer end of the insulator, the outer end of the member being sealed to the inner end of the housing, and a socket fixedly supported within the casing in which the terminal attached to the conductor is detachably insertable.

3. In combination, a casing containing a body of liquid and having an opening in its upper wall, a housing supported by the wall and extending through the opening, a cable comprising a sheathed insulated conductor supported by the housing and extending downwardly through it to a point below the level of the liquid in the casing, the said sheath of the cable terminating within the housing, a terminal secured to the lower end of the conductor, a socket permanently attached to the casing in which the terminal is detachably insertable, a tubular insulator surrounding the insulated end of the conductor of the cable, said insulator being secured fluid tight at its lower end to the terminal, the lower end of the insulator being below the level of the liquid in the casing, a corrugated member located within the casing and surrounding the cable, said member being secured fluid tight at its lower end to the insulator and at its upper end to the housing, and a body of liquid filling the housing and the interior of the tubular insulator which is independent of the body of the liquid in the casing.

4. The combination with an electric cable having an insulated conductor means and a surrounding metallic sheath, the conductor means and sheath having differential longitudinal movements, of a chambered casing having an opening in a wall thereof, a housing detachably supported by the casing in alignment with said opening and extending into it, said housing supporting the cable by its sheath at a point outside of the casing, a tubular insulator located inside of the casing and secured fluid tight at its inner end to the conductor means, a tubular metallic sleeve surrounding the outer end of the insulator and making a fluid tight connection therewith, a tubular corrugated diaphragm surrounding a part of the conductor in spaced insulated relation thereto, the outer end of the diaphragm being secured to the end of the housing that is located within the casing and the inner end of the diaphragm being secured to the tubular metallic sleeve, a socket located inside of the casing and fixedly supported by it, said conductor means being detachably insertable into said socket, and separate bodies of liquid insulation within the chamber of the casing and the housing.

5. The combination with an electric cable having an insulated conductor and a surrounding metallic sheath, the conductor and sheath having differential longitudinal movements, of a chambered metallic casing having an opening in a wall thereof, a housing detachably secured to the casing and forming a cover for said opening, said conductor extending through the housing, means located outside of the casing for securing the cable sheath to the housing, said means permitting the conductor to move longitudinally of the sheath, a terminal secured to and forming a part of the conductor, a tubular insulator located inside of the casing in spaced relation to the insulation on the conductor, said insulation being fixedly secured at its inner end to the terminal and being movable longitudinally with the conductor, a tubular elastic diaphragm surrounding the conductor, said diaphragm being secured fluid tight at its inner end to the outer end of the insulator and secured fluid tight at its outer end to the housing, a socket fixedly supported by the casing into which the terminal is detachably insertable, and a body of liquid insulation filling the housing and the space between the insulator and the conductor.

6. The combination with an electric cable comprising an insulated conductor and a surrounding metallic sheath, the conductor and sheath having differential longitudinal movements, of a chambered metallic casing having an opening in a wall thereof, a housing detachably secured to the casing and forming a cover for said opening, said conductor extending through the housing, a part of said housing projecting into the casing, means anchoring the sheath to the housing at a point outside of the casing, said means permitting the conductor to move longitudinally of the sheath, a tubular insulator located within the casing through which the conductor extends in spaced relation to the inner wall thereof, said insulator being in longitudinal spaced relation to the inwardly projecting part of the housing and having a peripheral shoulder, a metal sleeve surrounding the insulator at its outer end, said sleeve being movable with the insulator and having an inturned flange at its outer end, a nut carried by the sleeve and engaging the shoulder, said flange and nut rigidly clamping the sleeve to the insulator, a means rigidly securing the inner end of the insulator to the conductor, said insulator moving bodily with the inner end of the conductor, a corrugated tubular diaphragm through which the conductor extends, the outer end of the diaphragm being secured to the housing and the inner end to the sleeve so as to permit movements of the conductor and insulator independently of the sheath and housing, and a socket fixedly supported by the casing in which the conductor is detachably insertable.

HAROLD R. TURNER.